United States Patent [19]

Saliga

[11] 4,009,336
[45] Feb. 22, 1977

[54] DIGITAL SIGNALING DEVICE

[75] Inventor: Thomas V. Saliga, Clearwater, Fla.
[73] Assignee: Paradyne Corporation, Largo, Fla.
[22] Filed: Apr. 7, 1975
[21] Appl. No.: 565,589
[52] U.S. Cl. .......................................... 179/15 BY
[51] Int. Cl.² .......................................... H04J 3/12
[58] Field of Search ........ 179/15 BY, 15 BP, 2 DP;
340/172.5; 325/13, 37, 39, 64

[56] References Cited

UNITED STATES PATENTS

| | | | |
|---|---|---|---|
| 3,694,757 | 9/1972 | Hanna | 179/15 BY |
| 3,718,767 | 2/1973 | Ellis | 179/15 BY |
| 3,789,148 | 1/1974 | Ishii | 179/15 BY |
| 3,872,257 | 3/1975 | Bleickardt et al. | 179/15 BY |

Primary Examiner—Kathleen H. Claffy
Assistant Examiner—Joseph A. Popek
Attorney, Agent, or Firm—Stefan M. Stein

[57] ABSTRACT

A digital signaling device for use with a digital transmission network comprising signal generator means including carrier signal generation means to generate a synthetic digital request-to-send/carrier detect signal and command signal generator means to generate a plurality of digital command signals and signal control means to selectively control the transmission of the synthetic digital request-to-send/carrier detect signal and digital command signals, and signal recovery means including carrier signal recovery means to recover the synthetic digital request-to-send/carrier detect signal and command signal recovery means to recover any of the plurality of digital command signals and generate a control signal corresponding to the particular command signal recovered.

8 Claims, 6 Drawing Figures

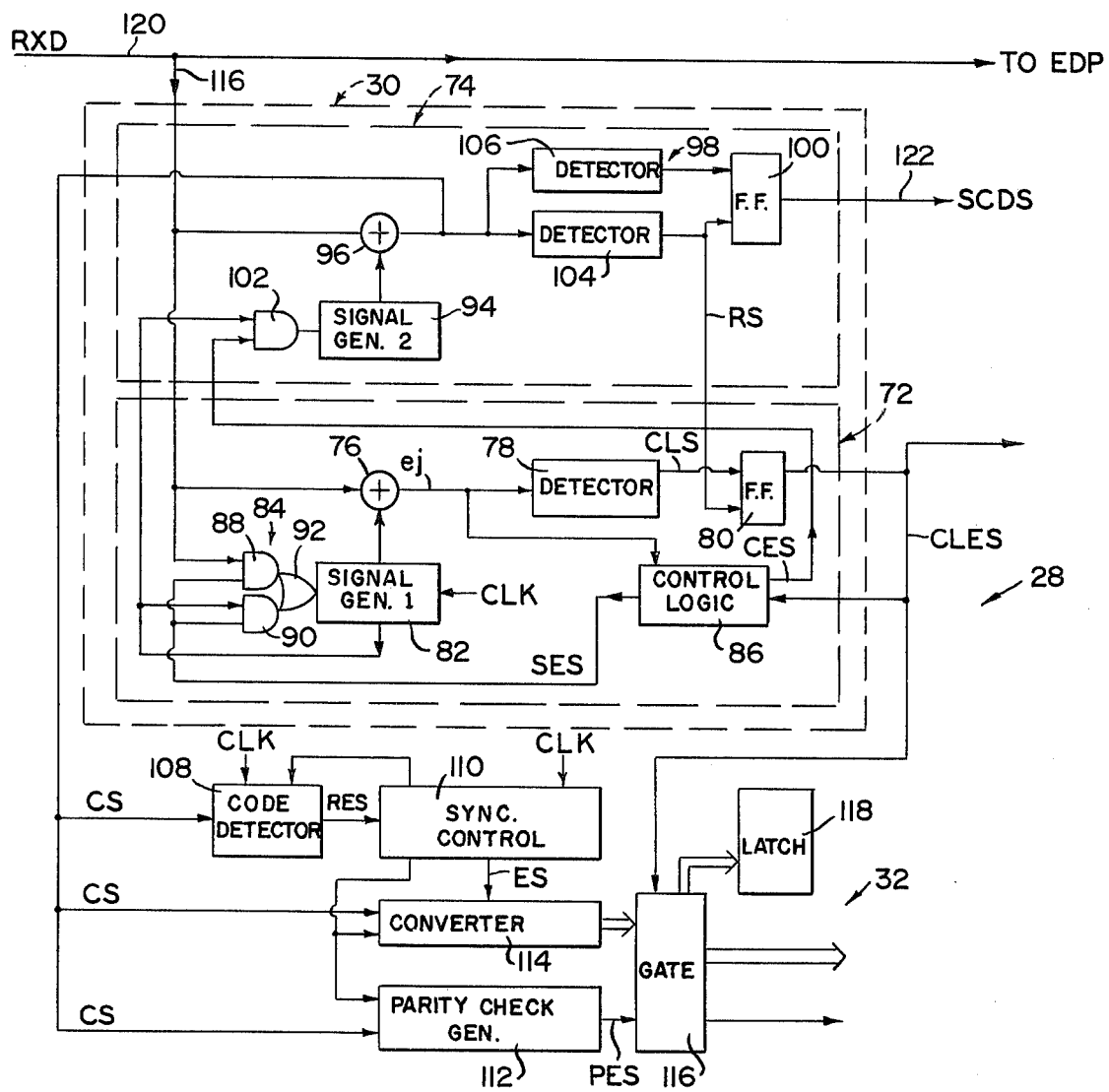
FIG. 4
FIG. 5
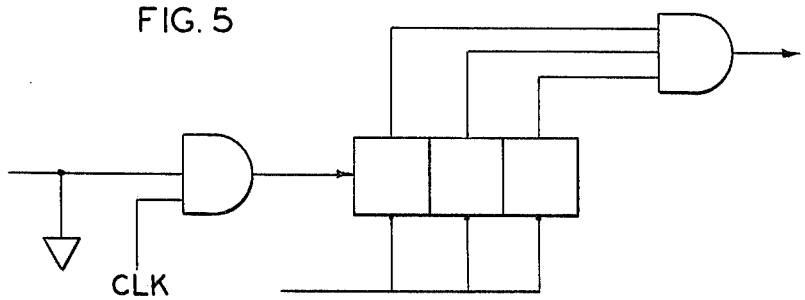
FIG. 6
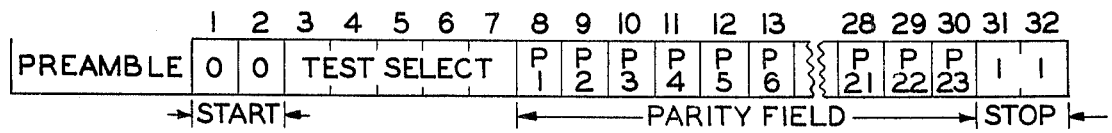

DIGITAL SIGNALING DEVICE

BACKGROUND OF THE INVENTION

1. Field of the Invention

A digital signaling device for use with a digital transmission network comprising a signal generator means to generate a digital signal for transmission over the digital transmission network to a remote site and a signal recovery means to recover the transmitted digital signal received from the remote transmitting site.

2. Description of the Prior Art

Conventional to modem communications comprises transmission of analog signals over existing telephone lines or dedicated transmission lines. Generally, a carrier signal is also transmitted as a positive indication that the signal received is a valid signal to properly control the associated electronic data processing equipment. Commonly the EDP equipment generates a request-to-send signal which is fed to a modem to indicate that the EDP equipment is ready to transmit data. Similarly, a carrier detect signal is generated by the receiving modem which is fed to its associated EDP equipment to indicate that the modem is receiving carrier detect signals from the remote site to enable the EDP equipment. This system is satisfactory for an analog signal transmission system.

It is desirable to transmit data in its digital form rather than to convert the data to analog signals for transmission and then convert back to digital form at the receiving site. There are many advantages to the long range transmission of data in its digital form rather than in analog form. Long distance transmission of data consists of sending data between microwave stations which are on the order of thirty miles apart. Typically, analog data is subject to the cumulative building of errors over each link in the system. However, in a digital transmission system at each microwave site the digital signal is reconstructed to the customer's original data and then transmitted to the next microwave link. So, while in an analog system errors (noise, etc.) which develop in the customer signal are amplified and forwarded at each microwave link, in a digital transmission system the customer data is reconstructed, eliminating error at each microwave link. However, in a digital transmission system there are no analog control signals present. It is necessary to simulate the analog control signals such as the request-to-send/carrier detect functions to properly operate the correct software function of the existing EDP equipment.

SUMMARY OF THE INVENTION

This invention relates to a digital signaling device for use with a digital transmission network. The digital signaling device is configured for use with a digital transmission network comprising at least two microwave stations for transmitting and receiving digital information multiplexed from a plurality of time sharing users. Each microwave station includes means such as modem to convey the data or information to and from on-site modems over existing analog transmission lines.

More specifically, the digital signaling device comprises a digital signal generator means including a digital carrier signal generator means, command signal generator means and signal control means including a carrier signal recovery means and command signal recovery means.

The carrier signal generator means comprises a signal generator means and a first and second modulator means while the command signal generator means comprises a command signal control multiplexer means, parity check generator means and a first multiple bit delay means. The signal control means comprises an enable logic means, second multiple bit delay means and select gate.

The carrier signal recovery means comprises a signal synchronization means and a carrier signal detect means. The signal synchronization means comprises a demodulator means, carrier signal detect means and state memory means, first carrier signal generator means, select gate and search control logic means. The carrier signal detect comprises a second carrier signal generator means, demodulator means, carrier signal detect means, and state memory and select gate means.

The command recovery means comprises a command code detector synchronization control, parity check generator means, serial to parallel converting means and enable gates and addressable latches.

In operation the carrier signal generator means is continuously generating a random output signal comprising a synthetic request-to-send (SRTS) signal which is fed to the first modulator means. The random pattern of the signal is such to statistically minimize the probability that the SRTS is the same as potential customer data. The SRTS is then fed to the second modulator means where it is modulated by command signals (CS) from the signal control generator as more fully described hereinafter.

The command signal control and multiplexer means is coupled through the interface to receive a plurality of command bits (CB) fed in parallel from associated peripheral equipment. The multiple bit delay means simultaneously receives command enable signals (CES) from the interface. The multiple bit delay means includes means to generate a control signal which is fed to the command signal control and a multiplexer means a predetermined plurality of bits later. This delay permits the receiving site to establish carrier synchronization. Prior to transmitting command signals, the command signal control and the multiplexer means generates a multiple bit word or a command signal which includes parity check bits generated by the parity check generator means. The command signal (CS) is then clocked to the second modulator means bit by bit every eighth bit of the carrier signal generator means by a control signal from the control portion where the command signal is modulated with SRTS signal from the first modulator means. The modulated command signal (MCS) is then fed to a select gate for transmission over the transmission medium.

The receiving digital signal recovery means receives the incoming digital signals which are fed to the signal synchronization means to establish synchronization. To establish synchronization of the synchronization command signal (SCS), N bits are shifted into carrier signal generator means and demodulator means which generates a first error signal, $ej$, the $ej$ is fed to the carrier signal detect means. When a plurality of successive bits are received error ($ej=0$) by the carrier signal detect means a carrier lock signal (CLS) is generated and fed to the state memory which generates a carrier lock enable signal (CLES) which is in turn fed to the search control logic means. The search control logic means generates a synchronization enable signal (SES) in response to the CLES which is fed to select gate means.

This locks up the output of the carrier signal generator means by inhibiting the input thereto through the select gate. The output of the first carrier signal generator means is then fed to the second carrier signal generator means through the gate which is enabled by the SES from the search control logic means. At anytime $ej=1$, the search control means looses lock causing the signal synchronization means to resume searching to re-establish synchronization.

The demodulated command signal is fed from carry signal recovery means to the command signal recovery means where it is coupled to the command code detector. The command code detector generates a read enable signal (RES) when a command signal is received. This is fed to the synchronization control. The synchronization control includes logic counters to establish an enable signal (ES) which is fed to the serial-to-parallel convertor means. It should be noted that the demodulated signal is continuously fed to convertor means and parity check generator means. The clock signal enables convertor means and a parity check means to scan every eighth bit. When parity is confirmed, a parity enable signal (PES) is fed to the enable gates. In addition, the multiple bit command signal is fed in parallel to the enable gates. The CLES from the state memory is also fed to enable gates enabling data to flow through enable gates.

To resume transmission of TXD when the user wishes to start sending data, a RST signal is generated. However, multiple bit delay means continues to generate a SES to present transmission TXD for the predetermined time delay. Simultaneously, the first modulator inverts SRTS for the predetermined time delay for transmission through the select gate to enable the remote receiving site to prepare to receive TXD.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 4 is a detailed schematic of a digital signal recovery means.

FIG. 5 is a schematic of a detector.

FIG. 6 is a time graph of the command sequence.

Similar reference characters refer to similar parts throughout the several views of the drawings.

DETAILED DESCRIPTION OF THE PREFERRED EMBODIMENT

Figure 1:
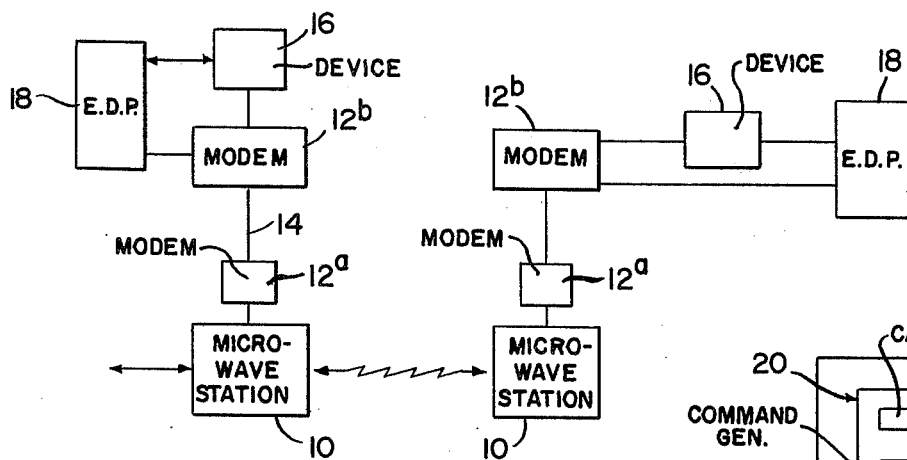
FIG. 1 is a block diagram of a digital signaling device integrated with a digital transmission network.

FIG. 1 shows a digital transmission network comprising at least two microwave stations 10 for transmitting and receiving digital information multiplexed from a plurality of time sharing users. Each microwave station 10 includes means such as a modem 12a to convey the data or information to and from on site modems 12b over existing analog transmission lines 14. As more fully described hereinafter, the present invention comprises a digital signaling device 16 coupled between modem 12b and EDP equipment 18. Modem 12b and digital signaling device 16 in combination with a control console (not shown) comprise a data control console.

As previously discussed, conventional modem to modem communication comprises transmission of analog signals over existing telephone lines or dedicated transmission lines. However, an analog carrier signal is not present in digital transmission network of FIG. 1. Without these analog signals, it is necessary to simulate the request-to-send/carrier detect function to operate existing EDP equipment as such is essential for correct software operations. To operate, the present invention generates a synthetic request-to-send signal and remote carrier detect signal without actually turning modems 12b "on" or "off." In addition, digital signaling device 16 is capable of transmitting command signal distinguishable from random customer data or channel bit errors.

Figure 2:
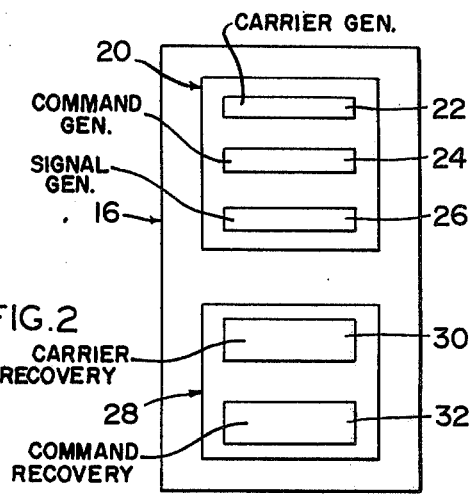
FIG. 2 is a block diagram of the digital signaling device.

As shown in FIG. 2, digital signaling device 16 comprises digital signal generator means 20 including carrier signal generator means 22, command signal generator means 24 and signal control means 26; and digital signal recovery means 28 including carrier signal recovery means 30 and command signal recovery means 32.

Figure 3:
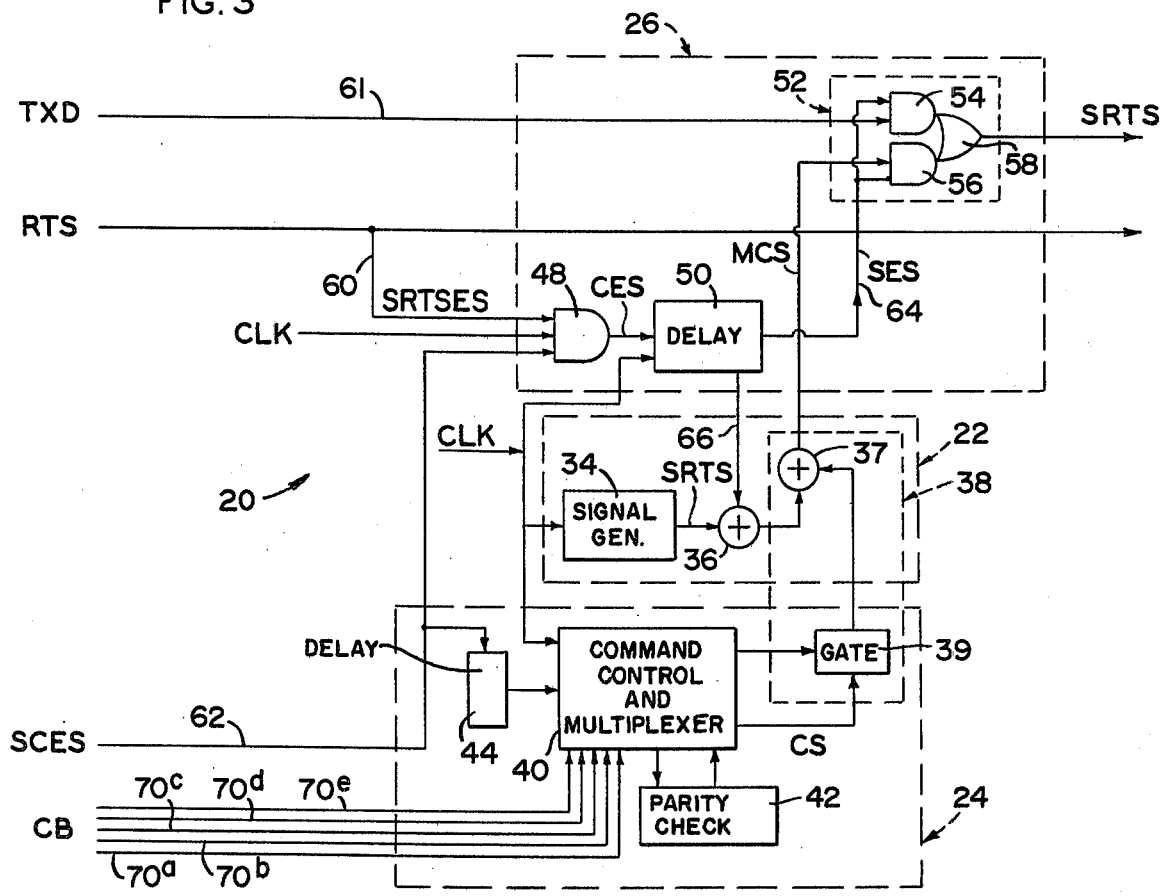
FIG. 3 is a detailed schematic of a digital signal generator means.

FIG. 3 shows a detailed schematic of digital signal generator means 20. As shown, carrier signal generator means 22 includes signal generator means 34 comprising a pseudo-noise generator, (PGN), first and second modulator means 36 and 38 respectively. First modulator means 36 comprising modulo 2 adder while second modulator means 38 comprises modulo 2 adder 37 and gate 39. Command signal generator means 24 includes command signal control and multiplexer means 40, parity check generator means 42 and first multiple bit delay means 44. Signal control means 26 includes enable logic means 48, second multiple bit delay means 50 and select gate 52 comprising AND gates 54/56 and OR gate 58.

AND gate 48 is coupled through a standard RS-232 interface (not shown) to peripheral EDP equipment to receive synthetic request-to-send enable (SRTSES) and synthetic command enable (SCES) signals through conductors 60 and 62 respectively. Enable logic 48 includes circuitry to select a predetermined priority pattern of mode selection. The enable logic means 48 generates a carrier enable signal (CES) in response to the SRTSES or SCES. The CES is fed to multiple bit delay means 50 which includes means to generate a select enable signal (SES) upon receipt of the CES. The SES is fed to select gate 52 through conductor 64.

Signal generator means 34 is continuously generating a random output signal comprising a synthetic request-to-send signal (SRTS) which is fed to first modulator means 36. The random pattern of signal generator means 34 is such to statistically avoid or minimize the probability that the SRTS is the same as potential customer data. The SRTS is then fed to second modulator means 38 where it is modulated by command signals (CS) from command signal generator means 24 as more fully described hereinafter.

Command signal control and multiplexer means 40 is coupled through the interface (not shown) to receive a plurality of command bits (CB) fed in parallel from associated peripheral equipment through lines 70a through 70e. Although only 5 bits are shown, any practical number of bits may be employed. Multiple bit delay means 44 receives the SCES from the interface (not shown) through conductor means 62. Multiple bit delay means 44 includes means to generate a control signal which is fed to command signal control and multiplexer means 40 a predetermined plurality of bits later. This delay permits the receiving site to establish carrier synchronization. As more fully described hereinafter, prior to transmitting command signals command signal control and multiplexer means 40 generates a 32 bit word or CS which includes 23 parity check bits generated by parity check generator means 42. Parity check generator means 42 comprises a 5-bit shift register with modulo 2 feedback. The 5 command bits are fed serially to parity check generator means 42 where parity is calculated. The CS is then clocked to second modulator means 38 bit by bit every eighth bit of the carrier generator means 34 by a control signal from the control portion where the command signal is modulated with SRTS signal from first modulator means 36. The modulated command signal (MCS) is then fed to select gate 52.

FIG. 4 shows a detailed schematic of digital signal recovery means 28. As shown, carrier signal recovery means 30 comprises signal synchronization means 72 and carrier signal detect means 74. Signal synchronization means 72 comprises demodulator means 76 comprising a modulo 2 adder, signal detect means 78, state memory means comprising a flip flop 80, first signal generator means 82, select gate means 84 and search control logic means 86. Select gate means 84 comprises AND gates 88 and 90, and OR gate 92. Carrier signal detect means 74 comprises second signal generator means 94, demodulator means 96 comprising a modulo 2 adder, signal detector means 98, state memory means comprising flip flop 100 and AND gate 102. Signal detector 98 comprises first burst detector and second burst detectors 104 and 106 respectively. Detectors 104 and 106 comprise a three bit binary ripple counter with a parallel "clear" as shown in FIG. 5 which generates an output to control memory 100.

As shown in FIG. 4, command signal recovery means 32 comprises command code detector 108, synchronization control 110, parity check generator means 112, serial to parallel convertor means 114, enable gates 116 and addressable latches 118.

Digital signal recovery means 28 is coupled to modem by detector means 120 to receive incoming digital signals. These incoming digital signals are fed simultaneously to demodulators 76 and 96, and select gate 84. Initially, signal synchronization means 72 searches to detect the MCS as previously described. To establish synchronization of the MCS, N bits are shifted into pseudo-noise generator 82 through select gate 84 and fed to demodulator means 76 which generates a first error signal, ej. Signal ej is fed simultaneously to signal detect means 78 and search control logic means 86. When 128 successive bits are received error free (ej=0) by signal detect means 78 a carrier lock signal (CLS) is generated and fed to state memory 80 which generates a carrier lock enable signal (CLES) which is fed to search control logic means 86. The search control logic means 86 includes means to generate a synchronization enable signal (SES) in response to the CLES which is fed to select gate means 84. This "locks" up the output of pseudo-noise generator 82 by inhibiting the input thereto through select gate 84. The output of pseudo-noise generator 82 is then fed to pseudo-noise generator 94 through gate 102 which is enabled by the SES from search control logic means 92. At anytime ej=1, the search control lock means 86 looses lock causing signal synchronization means 72 to resume searching to re-establish synchronization.

The demodulated signals are fed from signal recovery means 74 to command signal recovery means 32 where it is coupled to command code detector means 108. Command code detector means 108 is coupled to synchronization control means 110 to read every 8th bit. When 2 successive bits spaced at 8 bits intervals are 00, command code detector 108 generates a read enable signal (RES) which is fed to synchronization control 110. Synchronization control 110 includes logic counters to establish an enable signal (ES) which is fed to serial-to-parallel convertor means 114. It should be noted that demodulated signal is continuously fed to convertor means 114 and parity check generator means 112. The clock signal made available by 110 causes convertor means 114 and parity check means 112 to scan every eighth bit. When parity is confirmed, a parity enable signal (PES) is fed to enable gates 116. In addition, the 5 bit recovered command signal is fed in parallel to enable gates 116. The CLES from state memory 80 is fed to enable gates 116 enabling data to flow from enable gates 116. As shown, one or more command signals may be fed to addressable latch means 118 to produce a 2 state indication.

Operation of digital signaling device 16 can best be understood with reference to FIG. 3. As shown in FIG. 3, transmit data signal, TXD is normally fed from the EDP equipment through the interface to select gate 52 via conductor 61. Simultaneously, the output from delay means 50 is fed to AND gate 54 to enable the TXD to go through OR gate 58 to modem 12 for transmission over transmission medium 14 to microwave station 10. When the user discontinues the TXD as indicated by RTS "off" the SRTSES is fed from conductor 60 through gate 48 and delay means 50 to enable AND gate 56 and disable AND gate 54. The SRTS from pseudo-noise generator 34 is then fed through modulators 36 and 38 to AND gate 56 through OR gate 58 for transmission to microwave station 10.

To operate the command signal generator means 24, the CES is fed from the DCC to enable logic 48 and delay means 44 via conductor 62. As previously discussed, enable logic 48 generates an enable signal to enable the SRTS to be fed through select gate 52 for transmission to a remote site.

The CES is delayed for predetermined time delay by multiple bit delay means 44 before being fed to multiplexer 40. This permits transmission of 512 unmodulated SRTS bits from carrier signal generator 34 to establish synchronization at the receiving site. After this delay period, the 32-bit command word is generated and multiplexed. The timing section of multiplexer 40 enables gate 39 every eight bits to clock one bit of the 32-bit command word to modulator 38 to modulate the SRTS. The MCS is then fed through select gate 52 to modem 12 for transmission to the remote receiving site. The MCS will be continuously sent as long as the CES is present. As shown in FIG. 6, the command word comprises a plurality of bits including 2 "00" start code bits, 5 bits of information fed in parallel to word formal multiplexer/generator 40 via conductors 70a through 70e, 23 parity check bits and two "11" stop code bits.

To resume transmission of TXD when the user wishes to start sending data, a RTS "on" signal is generated. However, multiple bit delay means 50 continues to generate a SES to prevent transmission TXD for the predetermined time delay. Simultaneously, modulator 36 inverts SRTS for the predetermined time delay for transmission through select gate 52 to enable the remote receiving site to prepare to receive TXD.

At the receiving site, FIG. 4, the transmitted digital signal is received from microwave station 10, through the transmission medium 14 and modem 12. In normal operation, the TXD data signal is fed directly to EDP equipment 18 through conductor 120. When transmitting in the synthetic mode the SRTS is fed to carrier signal recovery means 30 as previously described. After synchronization has been established, signal control means 98 scans demodulated bits from demodulator 96. When a burst of 40 successive errorless bits are received and sensed by burst detector 104, it generates the SCDS (fifth digital output signal) which is fed to the interface by conductor 122. At anytime, a burst of 8 successive error bits are received and sensed by burst detector 106 it generates a RS disabling state memory 80 and 100.

When the MCS is transmitted and received the initial 512 bits are unmodulated as previously described which permits the carrier signal recovery means 30 to establish synchronization. The CS is then scanned and checked as previously described. Once a CS is received, the serial bits are fed in parallel to enable gates 116 which, when enabled by CES and CLES the command word is clocked through the interface to user.

It will thus be seen that the objects set forth above, among those made apparent from the preceding description, are efficiently attained, and since certain changes may be made in carrying out the above method and article without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed is:

1. A digital signaling device for use in combination with a digital transmission network having electronic data processing equipment interconnected therewith by analog transmission network, said digital signaling device comprising: signal generator means including a carrier signal generator means, said carrier signal generator means comprising means to generate a first digital output signal for transmission over the digital transmission network, command signal generator means having means to generate a second digital output signal, signal modulator means coupled to said carrier signal generator means and said command signal generator means, said signal modulator means having means to modulate said first and second digital output signals to generate a third digital output signal for transmission over the digital transmission network, signal control means coupled to said signal modulator means to selectively control the transmission of said first and third digital output signals; signal recovery means including a carrier signal recovery means having means to receive said first and third digital output signals and generate a fourth digital output signal in response thereto and command signal recovery means having circuitry to receive and detect said third digital output signal and generate said second digital output signal in response thereto.

2. The digital signal device of claim 1 wherein said signal control means includes enable logic means having means to generate a carrier enable signal in response to command enable signal and synthetic request to send enable signals from the electronic data processing equipment.

3. The digital signaling device of claim 1 wherein said command signal generator means includes a command signal control and multiplexer means having means to generate said second digital output signal in response to a plurality of command bits from the electronic data processing equipment.

4. The digital signaling device of claim 3 wherein said command signal generator means further includes a multiple bit delay means coupled between the electronic data processing equipment and said command signal control and multiplexer means, said multiple bit delay means having means to generate a delayed control signal in response to said command enable signal from the electronic data processing equipment, said delayed control signal being fed to said command signal control and multiplexer means to control the generation of said command signal, such that transmission of said third digital output signal is precluded by transmission of said first digital output signal for a predetermined delay.

5. The digital signaling device of claim 2 wherein said signal control means further includes multiple bit delay means and select gate means, said multiple bit delay means coupled to said enable logic means to receive said carrier enable signal, said multiple bit delay means having means to generate a select enable signal in response to said carrier enable signal, and select gate means coupled to multiple bit delay means to receive said select enable signals, said select gate means coupled to said signal modulator means to control the transmission of said first and third digital output signals in response to said select enable signals.

6. The digital signaling device of claim 3 wherein said signal modulator means includes gate means coupled to said command signal generator means, said command signal control and multiplex means further including means to generate an enable signal, said enable signal being fed to said gate means to control said gate, such that said second digital output signal is modulated with said first digital output signal in a predetermined pattern.

7. The digital signaling device of claim 5 wherein said carrier signal generator means further includes modulator means and signal generator means, said modulator means coupled to said signal generator means and said multiple delay means of said signal control means, said multiple bit delay means of said signal control means having means to generate a transition enable signal immediately following the succession of said carrier enable signals for a predetermined transition delay, said transition enable signal being fed to said modulator means to invert said first digital output signal for said predetermined transition delay prior to resumption of data transmission signals.

8. The digital signaling device of claim 1 wherein said carrier signal recovery means comprises a signal synchronization means and a carrier signal detect means, said signal synchronization means including a signal detect means, state memory means and search control logic means, said signal detect means having means to detect said first and third digital output signals and means to generate a carrier lock signal in response thereto, said state memory means coupled to said signal detect means to receive said carrier lock signals, said state memory means having means to generate a carrier lock enable signal in response to said carrier lock signals, said search control logic means coupled to said state memory means to receive said carrier lock enable signals, said search control logic means having means to generate a synchronization enable signal in response to said carrier lock enable signals, said carrier signal detect means coupled to said signal synchronization means to receive said synchronization and enable signal, said carrier signal detect means having means to detect said first and third output signals to generate a fifth digital output signal in response thereto in the presence of said synchronization enable signal.

* * * * *